(12) United States Patent
Bloebaum

(10) Patent No.: US 8,295,769 B2
(45) Date of Patent: Oct. 23, 2012

(54) WIRELESS CONNECTION FOR DATA DEVICES

(75) Inventor: L. Scott Bloebaum, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 989 days.

(21) Appl. No.: 12/210,769

(22) Filed: Sep. 15, 2008

(65) Prior Publication Data

US 2010/0069004 A1    Mar. 18, 2010

(51) Int. Cl.
*H04B 7/00* (2006.01)
(52) U.S. Cl. ............ 455/41.3; 455/41.1; 455/41.2; 345/157; 345/158
(58) Field of Classification Search ......... 455/41.1, 455/41.2, 41.3, 67.11, 423, 550.1; 345/157, 345/158
See application file for complete search history.

(56) References Cited

U.S. PATENT DOCUMENTS

| | | | | |
|---|---|---|---|---|
| 5,361,070 | A * | 11/1994 | McEwan | 342/21 |
| 6,587,763 | B2 * | 7/2003 | Ishikawa | 701/19 |
| 2004/0203381 | A1 * | 10/2004 | Cahn et al. | 455/41.2 |
| 2005/0198029 | A1 * | 9/2005 | Pohja et al. | 707/8 |
| 2006/0133401 | A1 * | 6/2006 | Ise et al. | 370/428 |
| 2007/0293261 | A1 * | 12/2007 | Chung | 455/550.1 |
| 2008/0039212 | A1 * | 2/2008 | Ahlgren et al. | 463/46 |

FOREIGN PATENT DOCUMENTS

| | | |
|---|---|---|
| WO | WO 2005/076542 A1 | 8/2005 |
| WO | WO 2007/065734 A2 | 6/2007 |
| WO | WO 2007/149763 A2 | 12/2007 |
| WO | WO 2008/007175 A1 | 1/2008 |

OTHER PUBLICATIONS

International Preliminary Report on Patentability dated Jan. 19, 2011 issued in corresponding PCT application No. PCT/US2009/043108, 9 pages.
International Search Report dated Jul. 20, 2009 issued in corresponding PCT application No. PCT/US2009/043108, 18 pages.

* cited by examiner

*Primary Examiner* — Tuan H Nguyen
(74) *Attorney, Agent, or Firm* — Snyder, Clark, Lesch & Chung, LLP

(57) ABSTRACT

A method and a system are provided for wirelessly connecting two data devices. A user intending to connect the devices issues a connect activation command and then moves one device toward the other device along a connection vector. Wireless communication connection is established through Ultra WideBand (UWB) protocol when the two devices are in range of each other. The wireless connection is terminated when the one device is moved along a displacement vector.

17 Claims, 4 Drawing Sheets

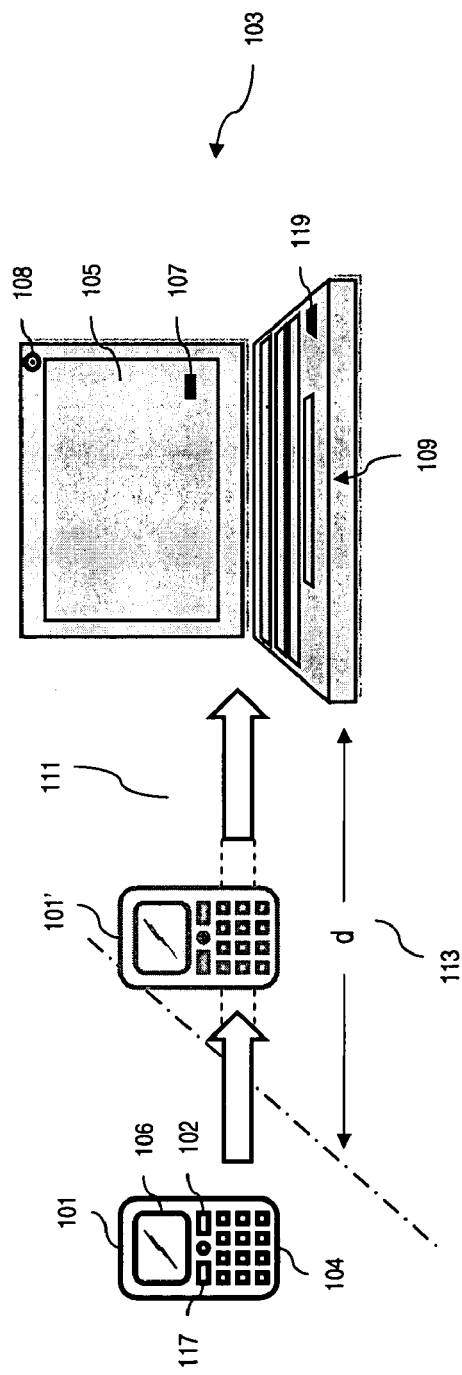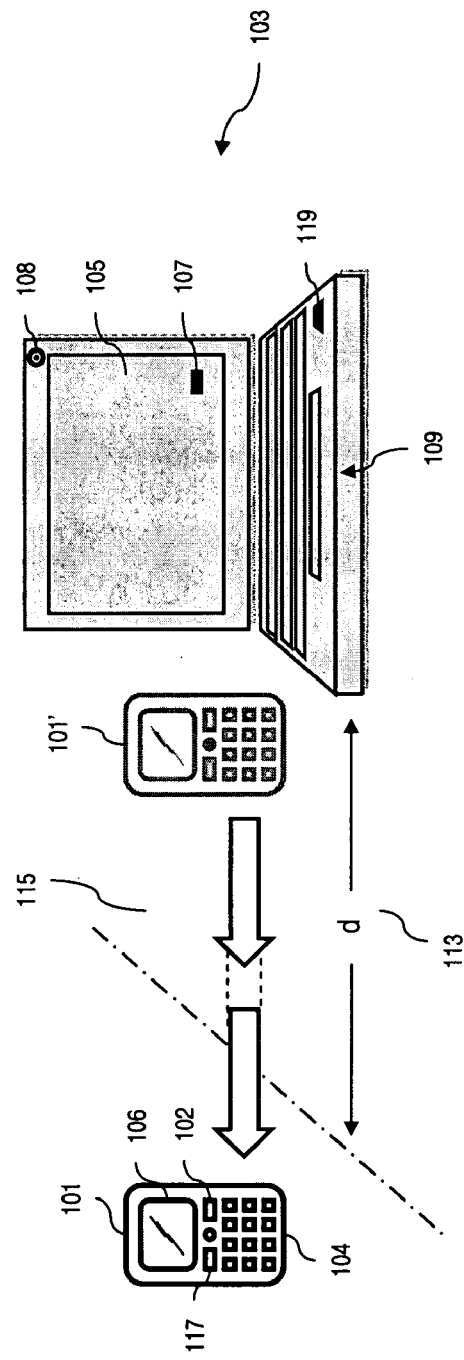

WIRELESS CONNECTION FOR DATA DEVICES

TECHNICAL FIELD

The present disclosure relates to interconnection of data devices, more specifically to wireless connection via a wireless protocol.

BACKGROUND

The use of conventional, or wired, Universal Serial Bus (USB) connectors is widely accepted within the field of Information Technology for its universal appeal as a quick and dependable way of connecting one electronic device to another. Originally designed as a quick connector for use with personal computers, USB has gained wide acceptance for use with a plethora of electronic devices from laptop computers to PDAs, mobile telephones, gaming consoles, flash drives, peripheral equipment, and the like, and has become the standard connection method. The design of USB is standardized by the USB Implementers Forum (USB-IF), an industry standards body incorporating leading companies from the computer and electronics industries. USB makes possible the connection of different types of peripheral equipment using a single standardized interface socket. Plug-and-play capabilities have been improved by allowing devices to be connected and disconnected without rebooting the computer, a procedure commonly known as "hot swapping." USB implementation provides power to low-consumption devices without the need for an external power supply and allows devices to be enabled without requiring installation of manufacturer specific device drivers.

The USB interface socket requires mating with a wired connector that is physically coupled to an external device. As technology has progressed to the convenience of a "wireless" world, it would be desirable to have the advantages that USB implementation provides without the attendant wired connections. The need exists for a wireless USB/UWB connector that can be easily connected/disconnected from various devices, resulting in an intuitive way for users to make wireless data connections between devices.

SUMMARY OF THE DISCLOSURE

A completely wireless connection/disconnection between two data devices is achieved in an intuitive manner through a wireless connection protocol. Preferred embodiments employ a USB or ultra-wideband (UWB) protocol, but other connection protocols, such as Bluetooth, USB on top of UWB, Wireless 1394, Universal Plug-n-Play (uPnP), WAP, SMS, 802.11g, 802.11a, or any other well known wireless connection protocol may be employed within the ambit of the present disclosure, which is not limited to any specific protocol. In the present description, "USB" will be employed to refer to conventional, wired USB, and "WUSB" will be employed to refer to wireless USB.

In an intuitive manner, a first data device that a user desires to be connected to a second data device is moved toward the second data device along a vector. An accelerometer, or other motion sensing means, within the first device senses movement of the first device along the vector toward the second device. A signal is input to a programmed processor. The processor, in conjunction with appropriate software, then sends appropriate information to the second, non-moving, device which then, acting in accordance with the appropriate wireless connection protocol effects the connection as if a wired USB connection, for example, was made.

In a preferred embodiment, an accelerometer is included within the first, moving, device. In a known manner, the accelerometer senses the dynamic acceleration of the first device being moved and the amount of sensed dynamic acceleration is then used to analyze the manner of movement of the first device. The accelerometer senses whether movement is towards the second, stationary device, and whether that movement is along a predetermined vector. If so, an appropriate signal will be sent to the second, stationary device in order to effect the wireless connection.

In another preferred embodiment, the second, stationary, device comprises a radar unit for emitting low level pulses along a predetermined vector towards a first device being moved towards the second, stationary device. If the radar unit within the second, stationary, device senses movement of the first device along the predetermined vector and within a predetermined distance of the second, stationary, device, the radar unit within the second, stationary, device sends the appropriate signal to a processor within the second, stationary device in order to effect a WUSB, or other wireless, connection between the first and second devices.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which:

FIG. 1(a) is a perspective view of establishment of a wireless connection of a mobile telephone to a laptop computer;

FIG. 1(b) is a perspective view of termination of a wireless connection between a mobile telephone and a laptop computer;

DETAILED DESCRIPTION

Figure 2:
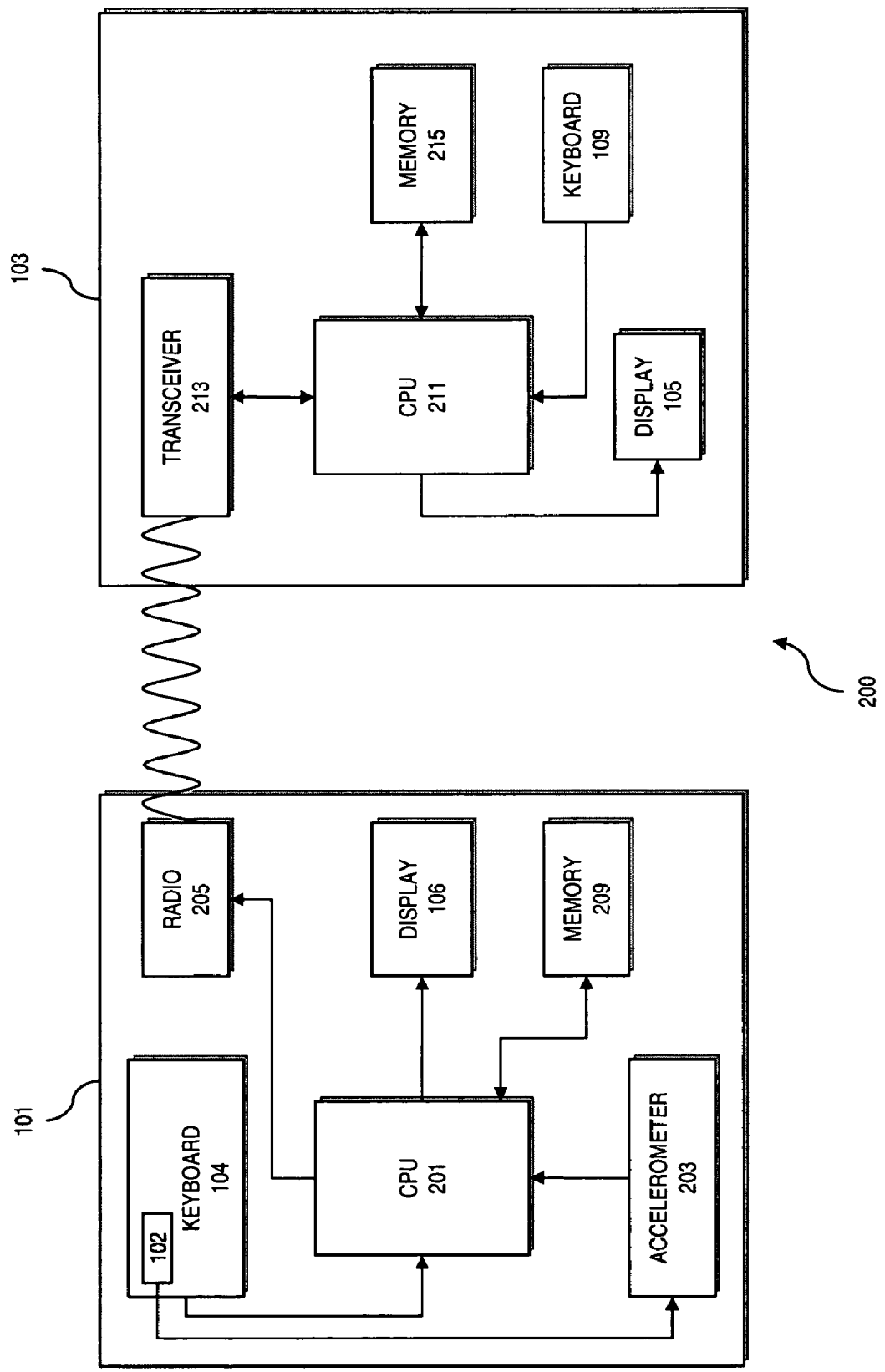
FIG. 2 is a block diagram of wireless devices of a first embodiment.

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments.

FIG. 1(a) illustrates establishment of a WUSB connection between two data devices. A first, movable, device 101 is depicted as a mobile telephone, but it should be understood by those of ordinary skill in the art that this first movable device may be a PDA, flash drive, or any other data device capable of connection to another data device.

In a preferred embodiment, prior to connecting first device 101 to a second device 103, the devices 101 and 103 should be powered on. To indicate an intention by the user to establish a wireless data connection between the first device 101 and a second, stationary, device 103, a key 102 on the first device may be activated. This key entry may, for example, activate a motion sensor within the first device 101.

The first device 101 is moved, by a user's hand, for example, towards a second device 103. The second device is depicted, for exemplary purposes, as a laptop computer, but it should be understood by those of ordinary skill in the art that this second, stationary, device may be any type of data device capable of connection to another data device. The laptop 103 has a display screen 105, a pop-up window 107 for indicating that a connection/disconnection of devices has been made/unmade, and a keyboard 109.

After activating key 102, or performing some other act, such as selection from a menu of options, or making a particular motion, etc., indicating an intention on the user's part to establish a data connection, the first, movable, device 101 is moved towards the laptop 103 along a predetermined displacement vector, depicted by the reference numeral 111. When the first device 101 is within a distance d, shown at 113, of the laptop, and along the vector 111, (e.g., first device 101 within distance d of the laptop 103 is depicted as 101'), a signal indicative of magnitude and direction of the motion vector 111 is sent from first device 101' to the stationary device 103. This transmitted signal will then be used by the stationary device to effect a wireless connection in accordance with whatever protocol it has been programmed to recognize, e.g., the devices 101' and 103 may be connected using the standard operation of a wireless protocol, e.g., WUSB. Data transfers may then be made in the same manner as if the connection was a wired USB connection. That is, data files may be transferred to/from the laptop; music files may be moved from the laptop to the mobile telephone, etc. When such a connection is effected, it is preferred that a pop up window 107 appear on the screen of laptop 103 in order to indicate that a "WUSB connection has been established," or some other message akin thereto. As will be understood by skilled artisans, the connection indication may also take the form of an audio message or a visual indicator 115 such as a light, etc. The pop up window 107 may present the message "WUSB connected" for a short predetermined amount of time and then disappear from the screen 105 so as not to be distracting to a user of the laptop 103. Alternatively, a colored light, or other visual indication, 108, may remain on during the entire duration of the data connection.

Because of the short range nature of the signals employed within the various disclosed embodiments, as a practical matter, a wireless connection can only be made within a distance d from the stationary device 103, the distance d being the effective range of the communication and sensing signals for the connecting protocol being employed.

The data connection established by the WUSB continues until the user desires to disconnect the first device 101' from the second device 103. This disconnect situation is depicted in FIG. 1(b).

When a user wishes to disconnect the WUSB connection between the first device 101' and laptop 103, the user merely pulls the first device 101' back away from the laptop 103 along the vector line 115, equivalent to, but in a direction opposite from, the vector 111. When the first device 101' is moved in this direction along vector 115, it is an indication to laptop 103 to end the WUSB connection by, for example, sending a signal to a processor within laptop 103 to break the wireless connection.

In order to provide for an affirmative action to indicate the user's intent to disconnect, the preferred embodiment requires movement along vector 115, in an opposite direction from connecting vector 111. The vector 111 is a displacement, not a speed, vector. To avoid unintentional disconnects which might occur, for example, if the first device 101' is accidentally moved by an elbow, inadvertently jostled, moved in some other manner, etc., a processor within first device 101' receives a signal from a motion sensing device, such as an accelerometer, and if there is a degree of match between the original motion towards the laptop 103 and the reverse disconnect motion, a disconnect signal is sent to the laptop for disconnecting the devices if the match is above a certain threshold. If the match is below the threshold, but above another threshold, one of the devices (either the mobile telephone or the laptop in the example herein) may be set to query the user about the user's intent to actually disconnect. The query is preferably displayed on the laptop 103 but may also be presented on the display 106 of the mobile telephone. Depending on the user's response, i.e., "yes" or "no," the wireless connection will either disconnect or not, respectively. Such a scheme, employing two separate thresholds, may be used to prevent unintentional disconnects even where the first device is moved a certain distance along the disconnect vector 115, but not as far as the motion along the vector 11 in establishing the wireless connection.

In another preferred embodiment, the disconnection of the WUSB can be established by the use of a button on either of the two data connection devices 101 and/or 103. There may be a disconnect key 117 and/or 119 on either one or both of these devices, the simple activation of which will disconnect the wireless connection. The advantage of the previously described embodiment, whereby the disconnect is established by an intentional pulling away of the first device from the second device along a vector, is that an accidental hitting of the disconnect key will not unintentionally disconnect the devices.

In still another preferred embodiment, not shown, rather than sensing motion, a connection/disconnection of the devices may be effected by a simple touching of the devices. That is, when a WUSB connection is desired between first device 101 and second device 103, an intention-to-connect key 102 may be activated and the first, movable, device 101 is moved towards the second, stationary, device 103 until the two devices are touching. This contact between the devices, at a predetermined area of the devices, is sensed and, upon contact, the WUSB connection is established. Disconnection is then established by merely pulling the first, movable, device 101 away from the second, stationary, device 103. In order to prevent an accidental disconnection, it may be required that the user activate a disconnect button 117 or 119 prior to disconnection to indicate the user's intention to disconnect. Then, the first device would be pulled away from the second device within a predetermined short time period after activating the disconnect button.

FIG. 2 is a block diagram depicting the first preferred embodiment wherein a motion sensor is employed within the first, movable, device 101.

Within system 200 is a first, movable, device 101, such as a mobile telephone, for example. After activating key 102 (indicating an intention by the user to establish a wireless connection) on keyboard 104 of the first device 101, the first device 101 is physically moved toward a second, stationary, device 103, such as a laptop computer, for example, along the vector 111, shown and described in FIG. 1(*a*).

The activating key 102 activates an accelerometer 203 within the first device 101. In a known manner, the accelerometer 203 senses the movement (velocity/displacement and direction) of the first device 101 and sends signals indicative of the movement to a processor, CPU 201. The CPU 201 is connected to a memory 209 for exchanging data needed by the CPU 201 during its processing functions. The CPU 201 is also connected to the display 106 of the mobile telephone, which is the exemplary first, movable, device. Moreover, the CPU 201 is connected to a radio device 205. The radio device 205 accepts signals from the CPU 201, said signals representative of movement data from the accelerometer 203 that have been processed. In particular, the movement signals are processed to determine location of the first device within a predetermined distance d and along vector 111, at which point the CPU 201 sends a signal to the radio device 205 for transmission to a transceiver 213 in the second device, or laptop, in this example. Laptop 103 comprises the typical components including CPU 211, display 105, memory 215, and keyboard 109. The signal received by the transceiver 213 is sent to CPU 211 in order to effect the wireless connection in a known manner in accordance with the specific type of wireless protocol being employed, e.g., WUSB or UWB.

Figure 3:
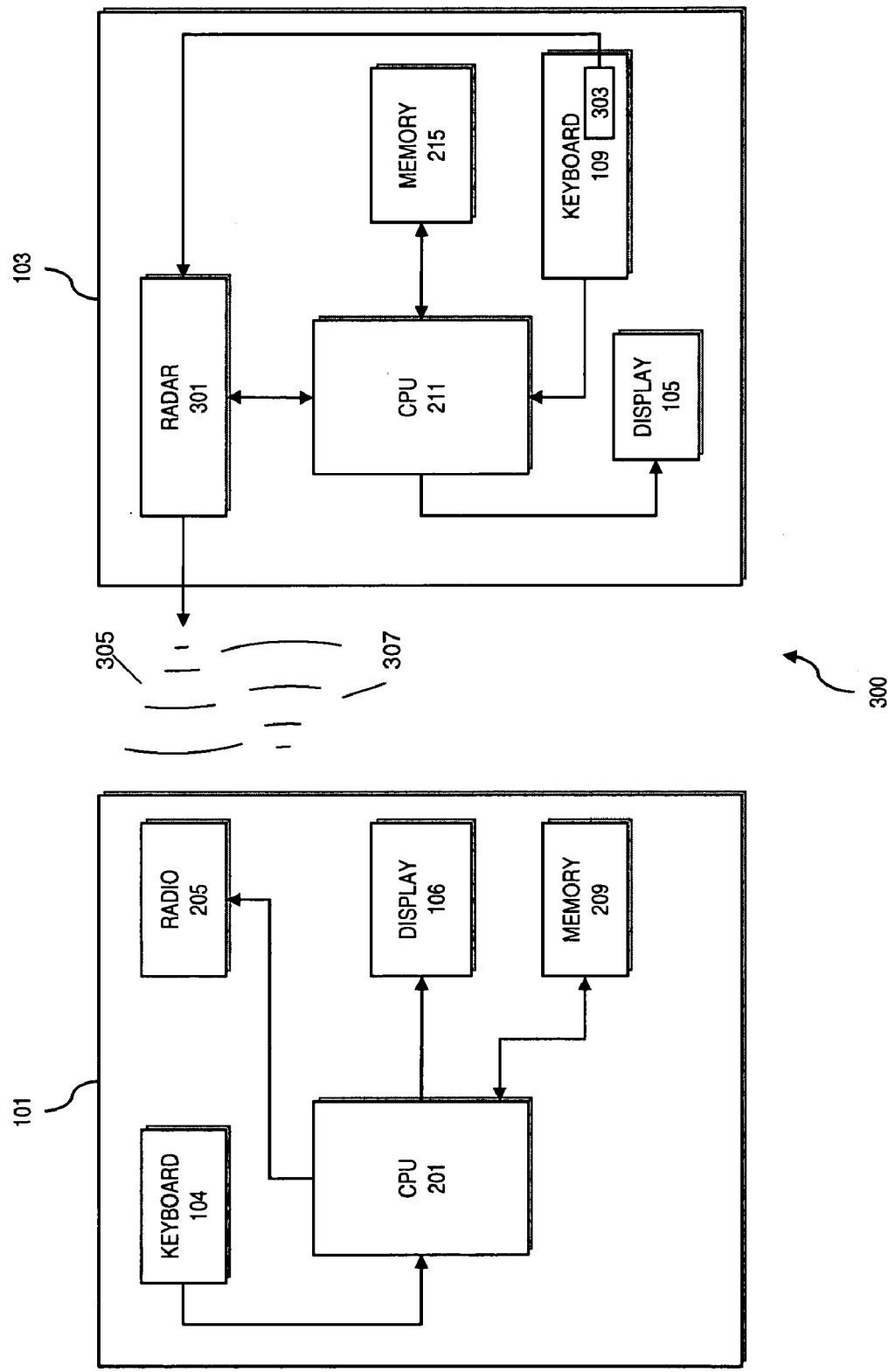
FIG. 3 is a block diagram of wireless devices of a second embodiment.

FIG. 3 is a block diagram depicting a second preferred embodiment wherein a radar unit is employed within the second, stationary, device 103.

Within system 300 is a first, movable, device 101, and a second, stationary device 103, with components similar to those described with reference to FIG. 2 except that in this embodiment, the motion detector is within the stationary device 103, rather than within the movable device 101. In particular, rather than the accelerometer 203 of the movable device 101 in the FIG. 2 embodiment, the motion detector in the FIG. 3 embodiment is embodied in a radar unit 301 as a component of the stationary device 103. After activating key 303 on keyboard 109 of the exemplary laptop 103 (indicating an intention by the user to establish a wireless connection between the first device 101 and the second device 103), which activates radar unit 301, the first device 101 is physically moved toward the second, stationary, (laptop) device 103 along the vector 111, shown and described in FIG. 1(*a*).

The movement of the first device 101 toward the laptop 103 is detected by radar unit 301. The radar unit 301 begins to emit low power, short-range pulses 305 upon actuation of key 303. The use of such radar pulses is particularly suitable where the Ultra Wide-Band (UWB) wireless protocol is employed because UWB already operates with radar-type pulse signals (UWB has applications in non cooperative radar imaging, using a large portion of the radio spectrum, and employs pulse coded information.) and those radar pulses may be used for determining motion of the first device in a simple and elegant manner. Therefore, this embodiment would be particularly useful and convenient with the UWB wireless protocol as the UWB protocol may be used for a dual purpose, i.e., for both sensing movement of the first, movable, device, and for actually effecting the wireless connection through the UWB protocol.

Pulse signals 307 returned from the movable device 101 are sensed by the radar unit 301 and sent to CPU 211 for further processing. Particularly, CPU 211 processes the return pulses 307 to calculate velocity and displacement of the first device along vector 111 and when it is determined that the first device is within a distance d of the laptop 103, and along the vector 111, a wireless connection is made in accordance with any appropriate wireless protocol being employed, e.g., UWB.

The wireless connection between first device 101 and second device 103 is maintained until the user initiates an intention to disconnect. That intention may be indicated by a simple activation of key 303, or a dedicated disconnect key. Alternatively, that intention may be indicated by a simple pulling away of the first device 101 from the second device 103 along a vector 115 opposite to vector 111. At a certain point along the vector 115, say at distance d from the second device, this point being sensed by the radar unit 301, a disconnect signal will be sent to the CPU from the radar unit 301, and the appropriate wireless protocol will be deactivated.

Figure 4:
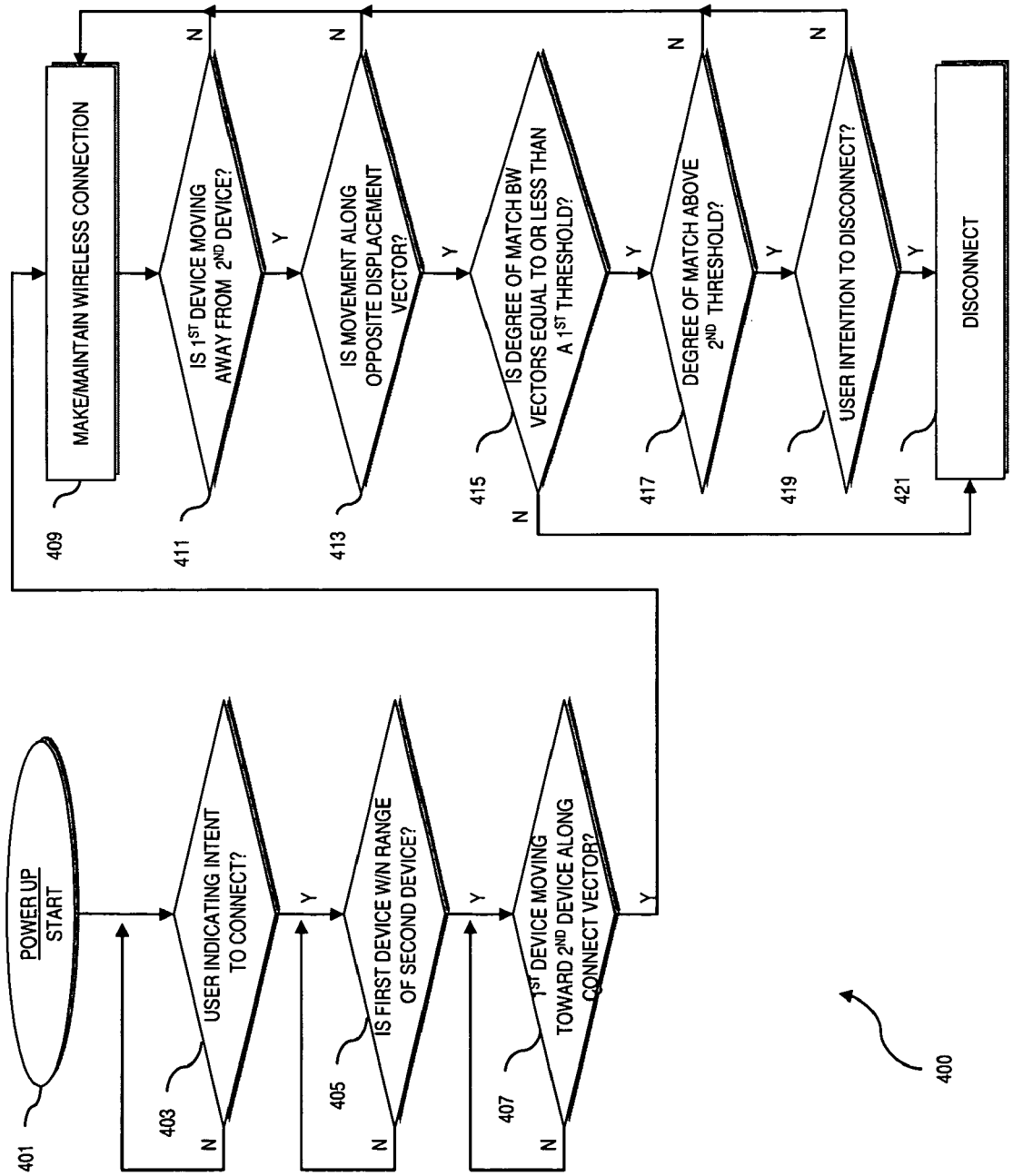
FIG. 4 is a flowchart of wireless connection and disconnection between two data devices.

Referring to FIG. 4, a flowchart 400 illustrates the operation of the wireless system and method for connecting data devices.

Initially, the two data devices to be connected should be powered-on at step 401. At step 403, the system determines if the user has indicated a desire to connect the devices. If the user has not so indicated, then the process returns to the top of process block 403 awaiting an intention by the user to connect the two devices. When the user has, in fact, indicated an intent to connect the two devices, by, for example, activating a key 102 on the keyboard of the first, movable device, the process moves on to block 405.

The system is monitored at decision block 405 in order to determine if the first device is within range, e.g., within a distance d, of the second, stationary, device. If the first device is not within distance d of the second device, the process returns to the top of block 405, waiting for the first device to be within range of the second device. The wireless protocols employed within the preferred embodiments are short-range and so distance d is rather close. Also, because of the short-range of the wireless protocol signals, there is very little chance of interference from other data devices that may be relatively nearby but not within range d. However, in order to provide for the situation where interference may otherwise occur, since wireless protocols typically employ the same channels, it may be that only certain devices may be selected to be employed by the inventive system, and/or means may be provided to insulate the two connecting data devices from spurious interference from other wireless devices. An exemplary interference avoidance device for wireless communication may be found in U.S. Pat. No. 6,928,266, for example.

When it is determined, at block 405, that the first device is within wireless operating range of the second device, decision block 407 of the process then determines whether the first device is moving towards the second device along a connection vector, which may be predetermined. If not, the process returns to the top of block 407, forming a loop in the process until such time as the first device is determined to be moving along the connection vector toward the second device. The purpose of this step is to avoid establishing a wireless connection between the two data devices when the first device may be within range of the second device, but the first device may have been accidentally moved. While the system knows, from step 403, that the user does intend to make the connection, step 407 insures that the user takes an affirmative step toward actually effecting the wireless connection.

Once it is determined, at block 407, that the user intends to make the wireless connection and that the first device is within range of the second device and moving towards the second device along the connection vector, the wireless connection is made at block 409 in accordance with the wireless protocol rules used to make the connection. For example, the wireless protocol may comprise a USB or UWB, Bluetooth, USB on top of UWB, Wireless 1394, Universal Plug-n-Play (uPnP), WAP, SMS, 802.11g, 802.11a, or any other well known wireless connection protocol.

While the connection vector may be "predetermined," it is understood that, in this case, the positions of the first and second devices would need to be known. As this will usually not be the case, other preferred embodiments would still utilize a vector as a connection criterion, but knowledge of the positions of the first and second devices would not be necessary.

In one such preferred embodiment, the user explicitly chooses a specific second device to which the first device is to be connected. This may be accomplished through a menu of options displayed on the display 106 of the first device, e.g., a mobile telephone. The menu displayed will be dependent on the number of applicable second devices sensed within a distance d from the first device. These second devices will be sensed by the first device in a known manner, similar to, for example, a laptop computer having a wireless capability and sensing possible wireless networks in its environment and then displaying these networks and presenting to the user a menu of such wireless networks from which to make a selection.

Alternatively, rather than having the user explicitly choose, via a menu, the second device to which it is desired to connect the first device, one or both of the devices may sense an increase in signal strength, in a known manner, as they are brought closer to each other. Responsive to this sensed increase in signal strength, the connection is made between the devices.

In either of these preferred embodiments, once the connection between the two devices is made, the connection vector is established and it is this established connection vector that is then used as the criterion for a disconnection determination, explained as follows.

Once the wireless connection is established at block 409, the wireless connection is maintained until such time as the user performs an act that affirmatively suggests that it is desired to disconnect the two data devices. This intention may be effected easily by way of a user activating a key, such as key 117 on the first device or key 119 on the second device and disconnecting the two devices in response to activation of either of those keys. However, in order to keep the connection/disconnection completely responsive to relative movement between the two data devices, and to avoid accidental disconnection by inadvertently hitting a disconnect key, block 411 monitors whether the first device is moving away from the second device. If it is not, the process continues to maintain the wireless connection established at block 409. However, if the first device is, indeed, moving away from the second device, it is then determined, at block 413, whether this movement is along a displacement vector equal, but opposite to the vector employed for making the wireless connection. If it is not, again, the wireless connection established at block 409 is maintained. However, if the first device is moving along the vector as determined at block 413, then the system determines at block 415 whether there is a degree of match between the original connecting vector 111 and the opposite displacement vector 115. In particular, block 415 determines if that degree of match is equal to or less than a first threshold value. If the degree of match is not equal to or less than the first threshold, then it is clear that the degree of match is above the first threshold value which is assurance that the user does intend to disconnect the wireless connection and so the process moves to disconnect block 421. However, if block 415 determines that the degree of match of the vectors is equal to or less than the first threshold value, the process moves on to block 417 to determine if that degree of match is above a second threshold value, the second threshold value being less than the first threshold value. If the degree of match is below the second threshold value (therefore below both threshold values), no disconnect is intended by the user and the process returns to block 409, maintaining the wireless connection. If, however, the determination at block 417 is that the degree of match is above the second threshold value (but below the first threshold value), the system is a bit unsure of the user's intention and inquires of the user, at block 419, if the user's intention is to disconnect the wireless connection. This inquiry may be made in a presentation on the display of either the first or second device, with the user responding by hitting an appropriate key, for example, such as "Y" for yes and "N" for no, although other actions by the user to indicate intent are also envisioned. If the user indicates that it is not the user's intention to disconnect, the process returns to block 409, maintaining the wireless connection. If the user indicates that it is the user's intent to disconnect, the process moves to disconnect block 421, where a disconnect is effected and the process returns to the top of block 403 where it awaits a signal of intent by the user to reestablish a wireless connection by a wireless protocol, such as a WUSB or UWB protocol, but other connection protocols, such as Bluetooth, USB on top of UWB, Wireless 1394, Universal Plug-n-Play (uPnP), WAP, SMS, 802.11g, 802.11a, or any other well known connection protocols may be used within the ambit of the disclosed embodiments.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and the drawings are accordingly to be regarded in an illustrative rather than restrictive sense.

What is claimed is:

1. A method comprising:
   emitting radar pulses from a first device towards a second movable device, wherein emitting the radar pulses further comprises emitting low power, short range radar pulses employed in, and compliant with, a wireless connection protocol and wherein the second movable device comprises a mobile telephone, a PDA, or a flash drive;
   processing pulses of the emitted radar pulses that bounce off of, and are reflected from, the second device to determine whether the second device has moved within a predetermined distance of the first device; and
   initiating a wireless connection between the first device and the second device, using the wireless connection protocol, if the second device has moved within the predetermined distance of the first device.

2. The method of claim 1, wherein the first device is a laptop computer.

3. The method of claim 1, wherein the wireless connection protocol comprises an Ultra Wide-Band (UWB) wireless connection protocol.

4. The method of claim 1, further comprising:
   deactivating the wireless connection protocol to disconnect the wireless connection if the second device has moved farther than the predetermined distance from the first device.

5. The method of claim 1, wherein the wireless connection protocol comprises one of a Universal Serial Bus (USB), an Ultra Wide-Band (UWB), a Bluetooth, a USB on top of UWB, a Wireless 1394, a Universal Plug-n-Play (uPnP), a WAP, a SMS, a 802.11g, or a 801.11a wireless connection protocol.

6. A first device, comprising:
a radar unit configured to emit low power, short range radar pulses employed in, and compliant with, a wireless connection protocol; and
a processing unit configured to
process pulses of the emitted radar pulses that bounce off of and are reflected from, a second movable device to determine whether the second movable device has moved within a predetermined distance of the first device, and
initiate a wireless connection with the second device, using the wireless connection protocol, if the second device has moved within the predetermined distance of the first device,
wherein the second movable device comprises a mobile telephone, a PDA, or a flash drive.

7. The first device of claim 6, wherein the first device comprises a laptop computer.

8. The first device of claim 6, wherein the processing unit is further configured to deactivate the wireless connection protocol to disconnect the wireless connection, if the second device is moved farther than the predetermined distance from the first device.

9. The first device of claim 6, wherein the wireless connection protocol comprises an Ultra Wide-Band (UWB) wireless connection protocol.

10. The first device of claim 6, wherein the wireless connection protocol comprises one of a Universal Serial Bus (USB), an Ultra Wide-Band (UWB), a Bluetooth, a USB on top of UWB, a Wireless 1394, a Universal Plug-n-Play (uPnP), a WAP, a SMS, a 802.11g, or a 801.11a wireless connection protocol.

11. A method, comprising:
emitting radar pulses from a first data device towards a second movable data device, wherein emitting the radar pulses comprises emitting low power, short range radar pulses employed in, and compliant with, a wireless connection protocol;
processing pulses, at the first data device, of the emitted radar pulses that bounce off of, and are reflected from, the second data device to determine whether the second data device has moved within a predetermined distance of the first data device; and
initiating a wireless connection between the first data device and the second data device, using the wireless connection protocol, if the second data device has moved within the predetermined distance of the first data device.

12. The method of claim 11, wherein the second movable data device comprises a mobile telephone, a PDA, or a flash drive.

13. The method of claim 11, wherein the first data device is a laptop computer.

14. The method of claim 11, further comprising:
deactivating the wireless connection protocol to disconnect the wireless connection if the second data device has moved farther than the predetermined distance from the first data device.

15. The method of claim 11, wherein the wireless connection protocol comprises one of a wireless Universal Serial Bus (WUSB), Ultra Wide-Band (UWB), a Bluetooth, a USB on top of UWB, a Wireless 1394, a Universal Plug-n-Play (UWB), a WAP, a SMS, a 802.11g, or a 801.11a wireless connection protocol.

16. The method of claim 11, wherein the second movable data device comprises a laptop computer, a gaming console, a peripheral equipment, a mobile telephone, a PDA, or a flash drive.

17. The method of claim 11, wherein the second movable data device comprises a laptop computer, a gaming console, a peripheral equipment, a mobile telephone, a PDA, or a flash drive and wherein the first data device is a laptop computer.

* * * * *